(12) United States Patent
Beer

(10) Patent No.: US 11,027,917 B2
(45) Date of Patent: Jun. 8, 2021

(54) RAIL-BOUND TRANSPORT ROBOT WITH LIFTING PLATFORM

(71) Applicant: HERON INNOVATIONS FACTORY GMBH, Dornbirn (DE)

(72) Inventor: Christian Beer, Schwarzach (AT)

(73) Assignee: HERON INNOVATIONS FACTORY GMBH, Dornbirn (DE)

( * ) Notice: Subject to any disclaimer, the term of this patent is extended or adjusted under 35 U.S.C. 154(b) by 0 days.

(21) Appl. No.: 16/132,586

(22) Filed: Sep. 17, 2018

(65) Prior Publication Data
US 2019/0084763 A1    Mar. 21, 2019

(30) Foreign Application Priority Data

Sep. 19, 2017    (DE) .......................... 102017121638.3

(51) Int. Cl.
| | |
|---|---|
| B65G 1/04 | (2006.01) |
| B66F 9/06 | (2006.01) |
| B65G 1/137 | (2006.01) |
| B66F 9/07 | (2006.01) |
| B65G 1/02 | (2006.01) |

(52) U.S. Cl.
CPC ......... *B65G 1/0428* (2013.01); *B65G 1/0457* (2013.01); *B65G 1/0464* (2013.01); *B65G 1/0478* (2013.01); *B65G 1/1373* (2013.01); *B66F 9/06* (2013.01); *B66F 9/063* (2013.01); *B66F 9/07* (2013.01); *B65G 1/02* (2013.01); *B65G 1/0407* (2013.01)

(58) Field of Classification Search
CPC ... B65G 1/0464; B65G 1/0457; B65G 1/0428
See application file for complete search history.

(56) References Cited

U.S. PATENT DOCUMENTS

| | | | | |
|---|---|---|---|---|
| 4,088,232 A | * | 5/1978 | Lilly .................... | B65G 1/0464 294/65.5 |
| 6,024,425 A | * | 2/2000 | Imai ......................... | A47F 1/00 312/35 |
| 6,762,382 B1 | * | 7/2004 | Danelski ................... | B07C 5/36 198/370.04 |
| 8,628,289 B1 | * | 1/2014 | Benedict .............. | B65G 1/0478 414/234 |
| 8,651,790 B2 | * | 2/2014 | Benedict .............. | B65G 1/0478 414/273 |

(Continued)

FOREIGN PATENT DOCUMENTS

| | | |
|---|---|---|
| DE | 10152019 | 5/2003 |
| DE | 202007000874 | 2/2008 |

(Continued)

OTHER PUBLICATIONS

Search Report for German Application No. 10 2017 121 638.3, dated Aug. 21, 2018, 9 pages.

*Primary Examiner* — Thomas Randazzo
(74) *Attorney, Agent, or Firm* — Faegre Drinker Biddle & Reath LLP

(57) ABSTRACT

A rail mounted transport robot with a lifting device, which is disposed in a recess of the transport robot such that it can be raised and lowered vertically and is suitable for receiving a load, wherein the lifting device is a powered loading platform that can be raised and lowered, with at least one longitudinal conveyor is disclosed.

17 Claims, 8 Drawing Sheets

(56) References Cited

U.S. PATENT DOCUMENTS

| | | | |
|---|---|---|---|
| 8,734,079 B1* | 5/2014 | Razumov | B65G 1/0492 |
| | | | 414/282 |
| 9,682,822 B2* | 6/2017 | Lindbo | B65G 1/0464 |
| 9,845,208 B2* | 12/2017 | Lindbo | B65G 59/063 |
| 2004/0165974 A1* | 8/2004 | Gironi | B66F 9/07 |
| | | | 414/281 |
| 2005/0042062 A1* | 2/2005 | Krusche | B62D 65/18 |
| | | | 414/234 |
| 2006/0072987 A1* | 4/2006 | Hoshino | B65G 1/0464 |
| | | | 414/277 |
| 2009/0229498 A1 | 9/2009 | Hamby et al. | |
| 2014/0044506 A1* | 2/2014 | De Vries | B65G 1/06 |
| | | | 414/277 |
| 2014/0277693 A1 | 9/2014 | Naylor et al. | |
| 2015/0307276 A1* | 10/2015 | Hognaland | G05B 19/41895 |
| | | | 700/218 |
| 2016/0060037 A1* | 3/2016 | Razumov | B65G 1/1378 |
| | | | 700/216 |
| 2020/0087066 A1* | 3/2020 | Gravelle | B65G 1/0478 |

FOREIGN PATENT DOCUMENTS

| | | | | |
|---|---|---|---|---|
| DE | 102007022484 | | 11/2008 | |
| DE | 2020112004492 | | 11/2012 | |
| JP | H04235822 | | 8/1992 | |
| JP | 10299280 A | * | 11/1998 | ............... B65G 1/04 |
| JP | H11278607 | | 10/1999 | |
| KR | 100930811 | | 9/2009 | |
| WO | 2010080539 | | 7/2010 | |
| WO | 2014075937 | | 5/2017 | |
| WO | 2014090684 | | 6/2017 | |

* cited by examiner

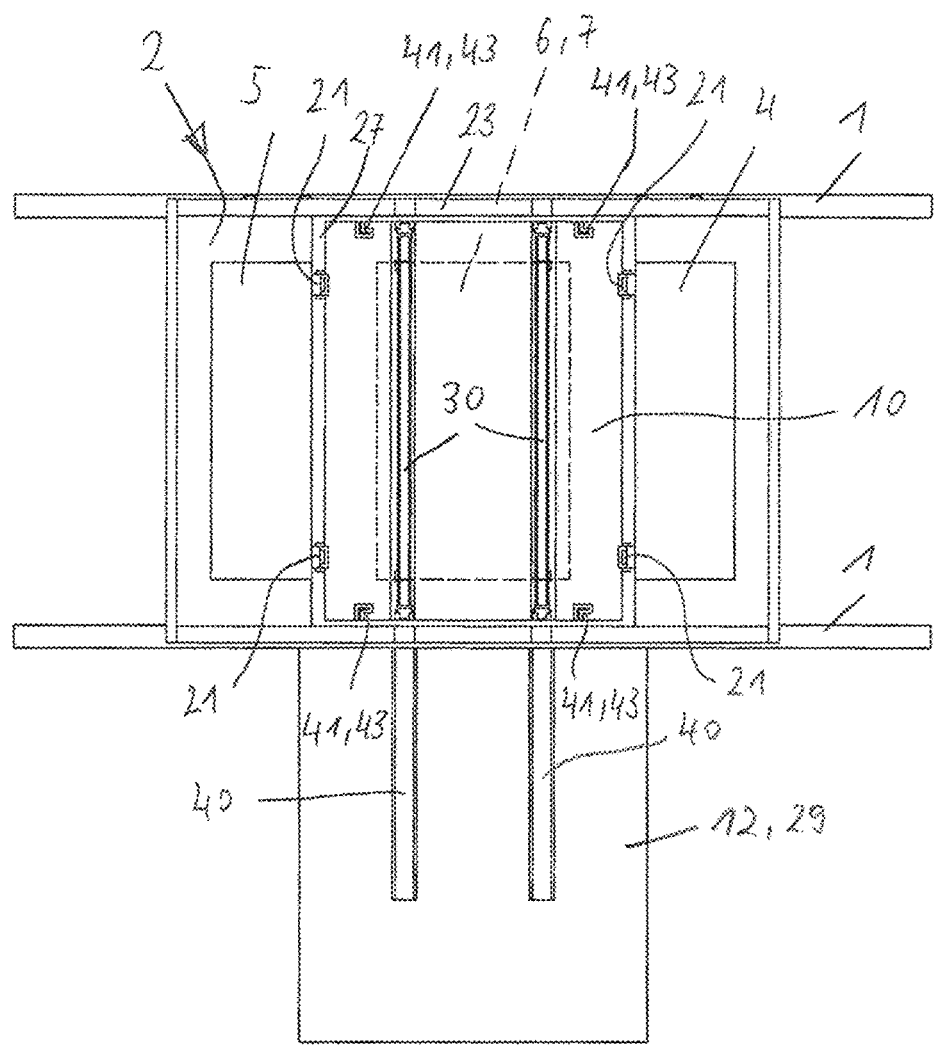

RAIL-BOUND TRANSPORT ROBOT WITH LIFTING PLATFORM

The invention relates to a rail mounted transport robot with a lifting device according to the preamble of claim 1.

CROSS-REFERENCE TO RELATED APPLICATION

The present application claims priority to DE 102017121638.3, filed Sep. 19, 2017, the entire disclosure of which is hereby expressly incorporated herein by reference

BACKGROUND/SUMMARY

A rail mounted transport robot is known through the subject matter of DE 10 2007 022 484 A1. A central recess is provided for a lifting device in the self-driving transport robot described therein, so that the transport robot can pick up a load with the lifting device attached to it at any position on the rails for the transport robot, and can bring the load suspended with the lifting device to another location.

The disadvantage with the known assembly is that the lifting device must always be adapted to the type and shape of the load that is to be transported, and it is not possible to transport loads of different shapes, or remove items, e.g. bottles, cans, bundles, cartons, etc. individually.

A further disadvantage with the subject matter of this document is that the lifting device must always be engaged with the load, and can only retain the load from above, thus limiting the mode of operation.

It is not possible to remove a variety of goods of the type specified above, because the lifting device can only be dedicated to one load.

Likewise, it is not possible with the known transport robot to unload, remove, or stack the loads at a right angle to the direction of lifting in a specific manner.

A lifting platform is known from the subject matter of DE 101 52 019 A1, which is not disposed on a self-driving transport robot. The field of application for such a lifting tool is limited for this reason.

Another rail mounted transport robot is known from the subject matter of WO 2014/090684 A1, which has a bottom-mounted lifting platform, which is equipped with a loading tongs.

The lifting platform is only suitable for receiving units or loads precisely matching the shape of the loading tongs, and they cannot be adapted to loads or goods of different shapes. Likewise, a lateral unloading or lateral guidance of loaded or unloaded goods is not possible.

The same criticism also applies to a lifting device comprising the subject matter of WO 2014/075937 A1, because this only relates to a lifting tool mounted on vertical rails, which has a loading basket in which goods can be placed. No loading means for loading the basket is depicted. Likewise, a lateral removal of the goods that have been loaded is not possible.

A similar object is also depicted in KR 100930811 B1, in which a lifting platform is disposed on a lifting framework, onto which a bicycle, by way of example, can be placed. A lateral removal or loading of goods that is not dependent on the shape is not disclosed in this document.

The fundamental object of the invention is therefore to further develop, based on DE 10 2007 022 484 A1, a rail mounted transport robot with a lifting device of the type specified in the introduction, such that the mode of operation can be expanded.

The invention is characterized by the technical teachings of claim 1 for achieving this object.

The lifting device is preferably designed as a loading platform, which has its own loading means, which is able to move and remove goods on the loading platform transverse to the lifting direction.

The advantage is obtained with these technical teachings that it is now possible, for the first time, to operate a loading platform with a rail mounted transport robot, which enables a horizontal loading plane to be formed, on which non-specifically shaped goods, e.g. in the form of a crate, carton, bottle, cans, bundles etc., can be loaded without this resulting in a type of lifting claw, such as is known from the aforementioned prior art.

Accordingly, the lifting platform forms a loading platform according to the invention that is suitable for receiving goods of an unspecified shape, and according to the further feature of the invention, a loading means is mounted on the loading platform, which is designed as a longitudinal conveyor in a preferred embodiment.

This results in the possibility of creating a lifting conveyor that moves along horizontal rails, with a vertical loading of the goods, and also a horizontal unloading of the goods.

A "longitudinal conveyor" is understood to mean any conveyor or removal means on the loading platform capable of moving (laterally) one or more non-specifically shaped loads on the loading platform in a direction transverse to the (vertical) lifting direction of the loading platform.

In a preferred embodiment, the removal means is in the form of a conveyor belt, wherein in another embodiment, this conveyor belt is composed of two parallel and synchronized carrier belts, toothed belts, or strap belts.

In another embodiment, this conveyor means can also be composed of a single continuous conveyor belt, or it can comprise a chain conveyor, a rope conveyor, or some other type of longitudinal conveyor.

In a third embodiment a flap can be provided in the loading platform, hinged such that it pivots over a horizontal axis, through which loose goods on the loading platform can be unloaded downward.

In a preferred embodiment of the invention, the transport robot is comprised of an autonomously driven device that automatically carries out transport duties on the rails, which is controlled electronically.

It is advantageous that a lifting device is mounted on the transport robot, which is comprised of two parallel, spaced apart lift drive gearboxes in the exemplary embodiment shown herein, which are located to the left and right of a central recess in the transport robot.

An individual drive motor with a dedicated drive shaft is disposed in each of the lifting drive gearboxes, and the drive shaft drives winding drums, connected on both sides for conjoint rotation therewith, around which the lifting means is wound. In a preferred embodiment, the lifting means comprises a lifting belt.

Any other type of lifting means can also be used instead of lifting belt, e.g. ropes, chains, bead chains, belts or cords, etc.

It is important, in any case, that the loading platform is stored in a recess in the transport robot close to the ground when in the resting state, and that the goods that are to be removed are loaded onto the longitudinal conveyor located on the loading platform. As a result, the transport robot can unload or receive loads at any location along the rails.

Such a load can be non-specifically shaped goods (such as bottles, cans, bundles, packages), or it can be a crate, carton or tray.

For purposes of simplicity, it shall be assumed that the load is in the form of a crate in the following description, although the invention is not limited thereto.

When the loading platform is lowered with the crate thereon, it is lowered until the upper edge of the loading platform is level with the floor of the unloading plane of an unloading space laterally adjacent thereto.

In this manner, it differs substantially from the prior art, because in the prior art, the unloading spaces were always directly beneath the transport robot, and not to the side.

This has the advantage that the transport robot can travel down aisles in a shelved storage. Crates or other types of bulk goods are stacked in columns and rows in a shelved storage. As a result, the transport robot is able to remove such a crate laterally from a row, load it, and bring it elsewhere.

The reverse is of course also true, such that a crate or suchlike can be placed on the shelves from the loading platform.

The shelved storage comprises crates stored vertically, i.e. each crate is placed on a shelf, thus separating the crates in terms of their weight, and ensuring that only one crate can ever be removed at a time from a specific row and column.

A further advantage of the invention is that the crates removed from the shelves can also comprise only one half of a load format, i.e. two identically shaped half-crates can be removed from a single space in the shelves onto the loading platform of the transport robot. It is also possible to remove just one halved crate or carton, etc. (or a crate etc. comprising a third or a quarter of a load). As a matter of course, if such a crate can be halved, it may also be possible to break it down further, i.e. into thirds or quarters of the overall load.

It is important in all of the embodiments that the unloading and loading of the goods takes place laterally beneath or adjacent to the transport robot, and no longer directly underneath the transport robot, which substantially expands the field of application according to the invention for such a rail mounted transport robot according to the invention. For this, it is provided that the longitudinal conveyor has a telescoping design. This means its active extension length can be nearly double or triple its resting state length. It can thus comprise a simple telescoping in one embodiment, and a double telescoping in another embodiment.

Specifically in WO 2014/090684 A1 specified in the introduction, there is the disadvantage that the goods in the shelved storage were stacked in columns, thus bearing down on one another, and causing friction between them, which is associated with the disadvantage that the lowest crate, or the lowest load is subjected to a very heavy pressure, which may result in a deformation of the goods.

The invention addresses this problem in that it provides shelved storage for crates or other loads which are supported on different panels, and separated from one another in terms of weight, such that it is possible to remove one or more loads laterally from the shelving, independently of the weight, and load it or them onto the loading platform.

If the lowest crate needs to be removed individually with the subject matter of WO 2014/090684 A1, all of the other crates lying above it have to be removed, which is a problem that the invention eliminates. With the invention, each crate can be accessed individually in a specific shelf in a shelved storage. Such a crate is removed laterally, and not in the direction of lifting.

The invention has the advantage that because of the lifting distance between the transport robot and the loading platform connected thereto via the lifting device, the loaded goods can be (laterally) unloaded horizontally at various vertical levels, which is not possible with the prior art. This is provided by the telescoping longitudinal conveyor.

To control the loading platform with the circuitry and control elements located therein, it is provided in one embodiment that a radio interface is active between the transport robot and the loading platform, which transmits the corresponding positioning and control commands through radio communication.

In another embodiment, a wired connection may be provided between the transport robot and the loading platform.

The wired connection can also be installed in the conveyor belts or run parallel thereto.

The invention also provides a method for operating a transport robot in a shelved storage composed of rows of shelving and aisles therebetween, wherein numerous columns of shelves are formed in the rows, which form numerous storage spaces for goods, in particular crates, wherein the rail mounted transport robot with a lifting device, which is disposed in a recess in the transport robot such that it can be raised and lowered vertically and is suitable for receiving a load, connects the aisles between the rows for transport therebetween. As a result, the goods stored on the shelves can be moved or slid to any storage space in the shelving at any level.

A transport robot used for this in the shelved storage is preferably designed such that the transport robot with a lifting device, which is disposed in a recess in the transport robot such that it can be raised and lowered vertically and is suitable for receiving a load, connects the aisles between the rows for transport therebetween.

In a further development, the loading platform, which can be raised and lowered, and which is suspended from lifting belts, toothed belts, ropes or cables, can also be stabilized with respect to its lifting movement, in that the loading platform still retracted into the transport robot can latch onto vertical guide rails. The guide rails are located in the proximity of the storage space or on the shelving, and form a vertical guide for the loading platform, which can thus unload the goods into a storage space without vibrating or displacement.

The subject matter of the present invention can be derived not only from the subject matter of the individual claims, but also from combinations thereof.

All of the details and features disclosed in the documents, including the abstract, and in particular the spatial configurations illustrated in the drawings, are claimed as substantial to the invention, insofar as they are novel with respect to the prior art, individually or in combinations thereof. Insofar as individual objects are referred to as "substantial to the invention" or "important," this does not mean that these objects must necessarily form the subject matter of an independent claim. This is determined solely by the respective asserted version of the independent claims.

BRIEF DESCRIPTION OF THE DRAWINGS

The invention shall be explained below in greater detail, based on drawings depicting just one possible embodiment.

Further features and advantages that are substantial to the invention can be derived from the drawings and their descriptions.

Figure 1:
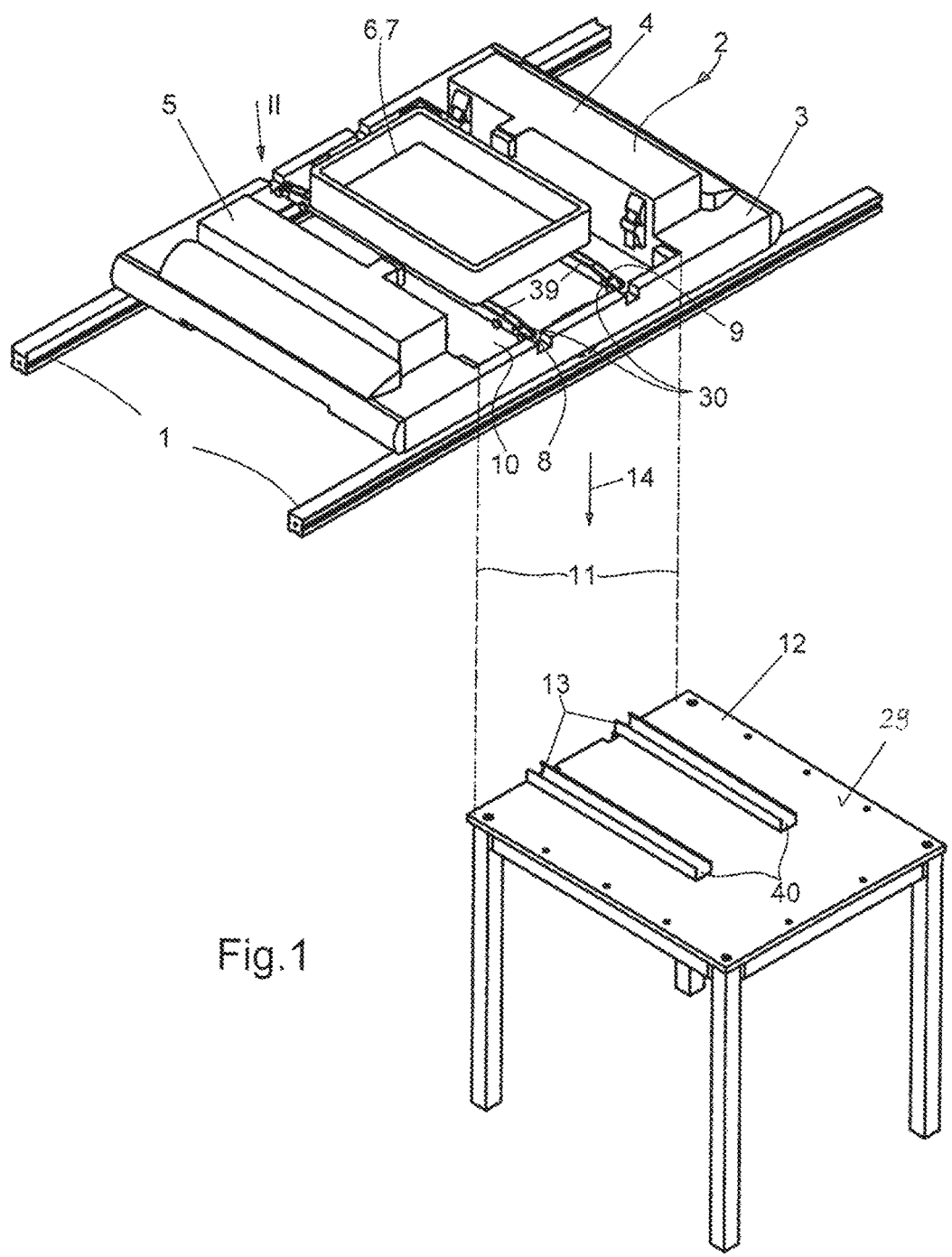
Figure 2:
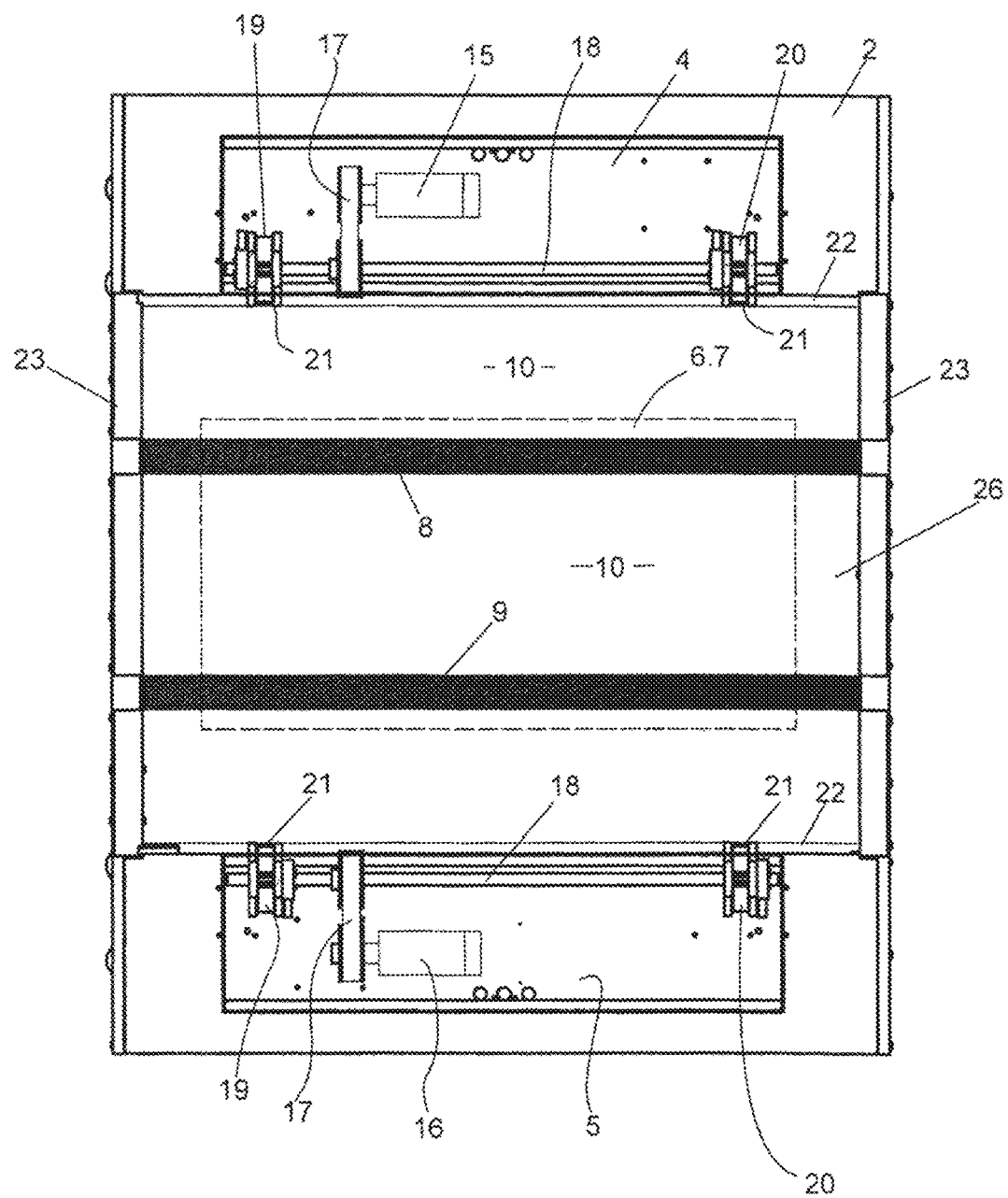
Figure 3:
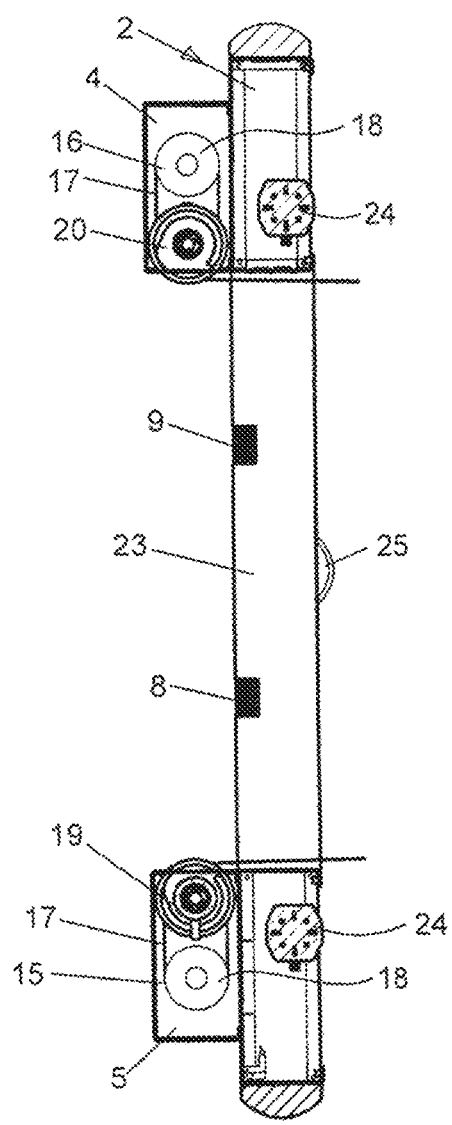
Figure 4:
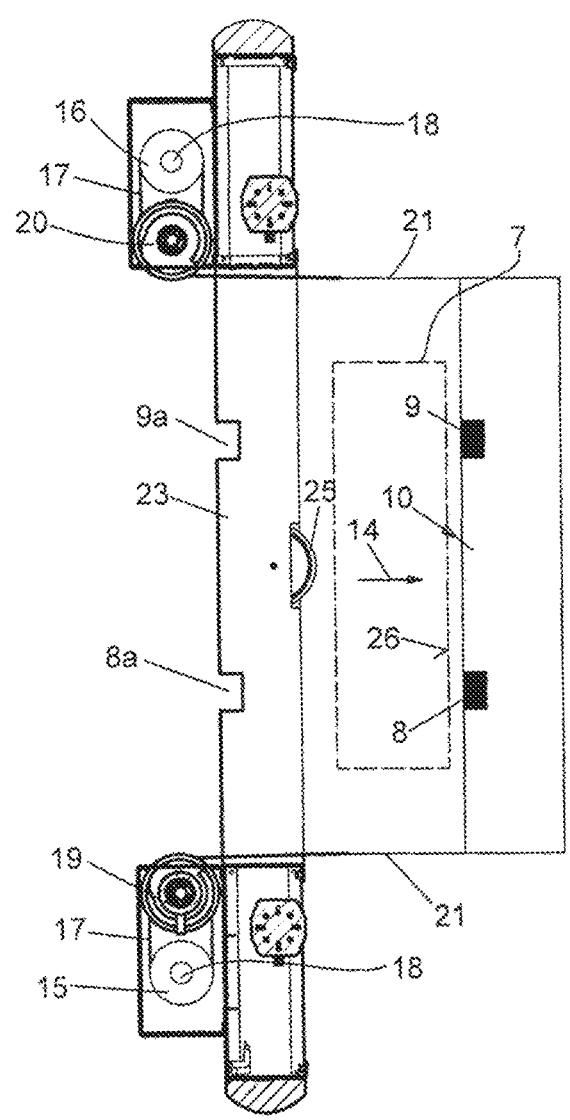
Figure 5:
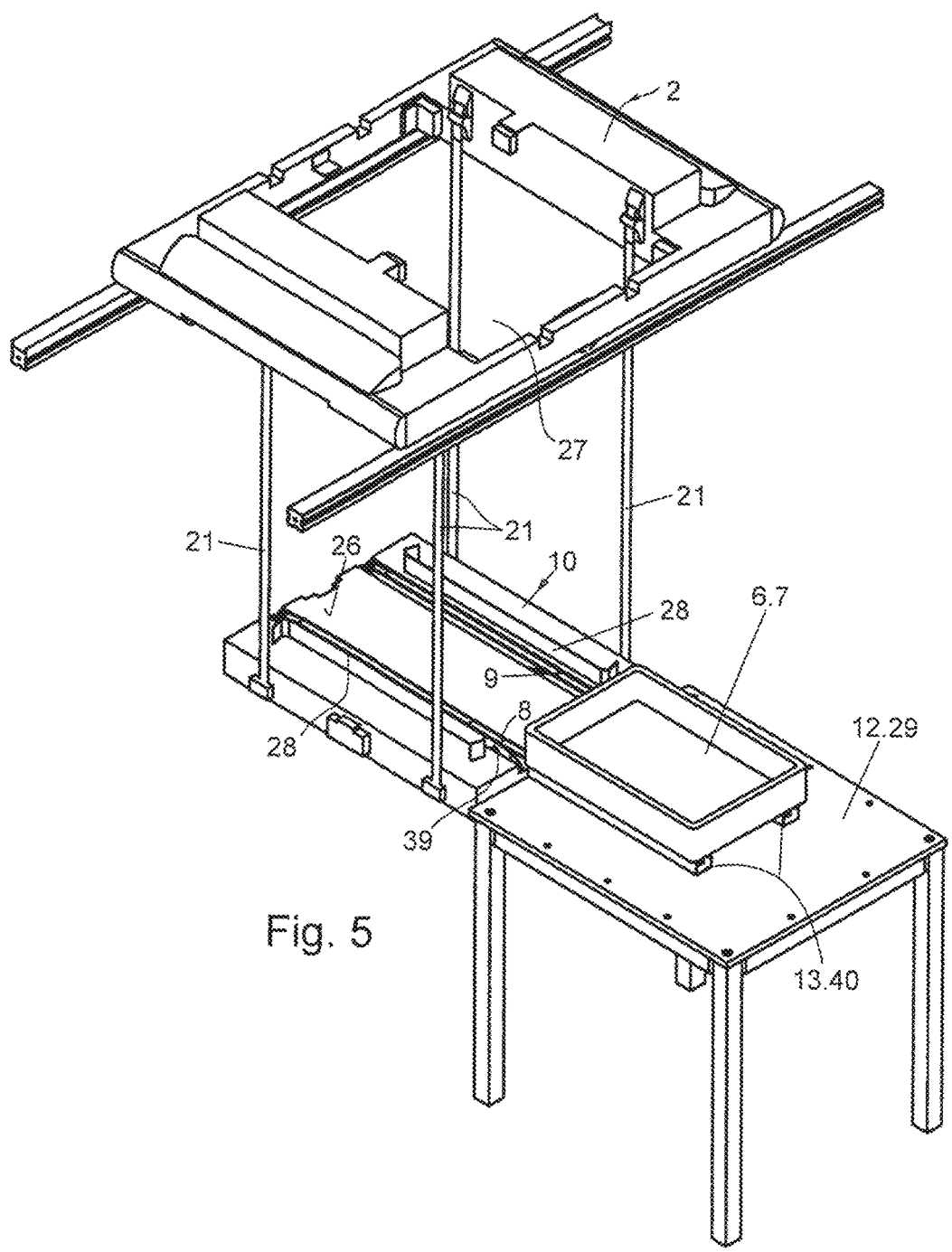
Figure 6:
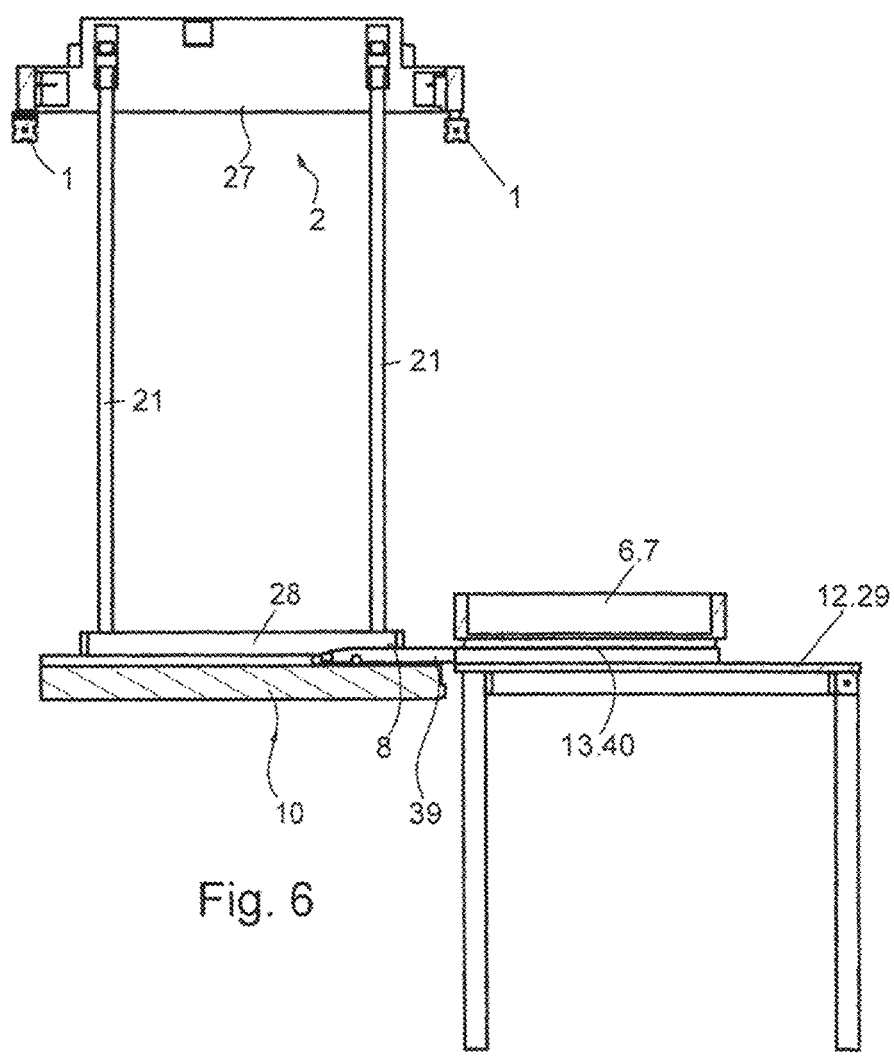
Figure 7:
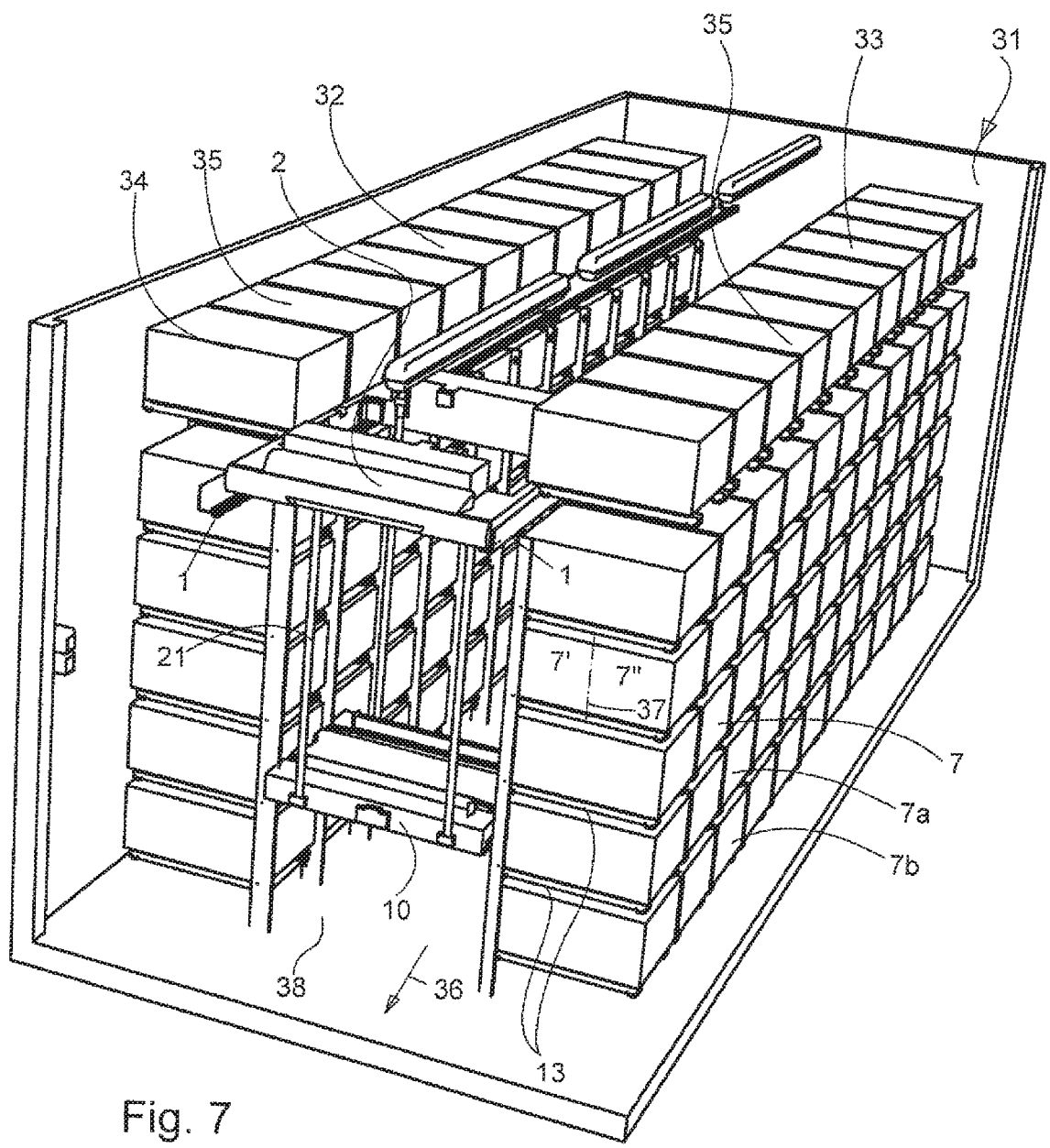
Figure 8:
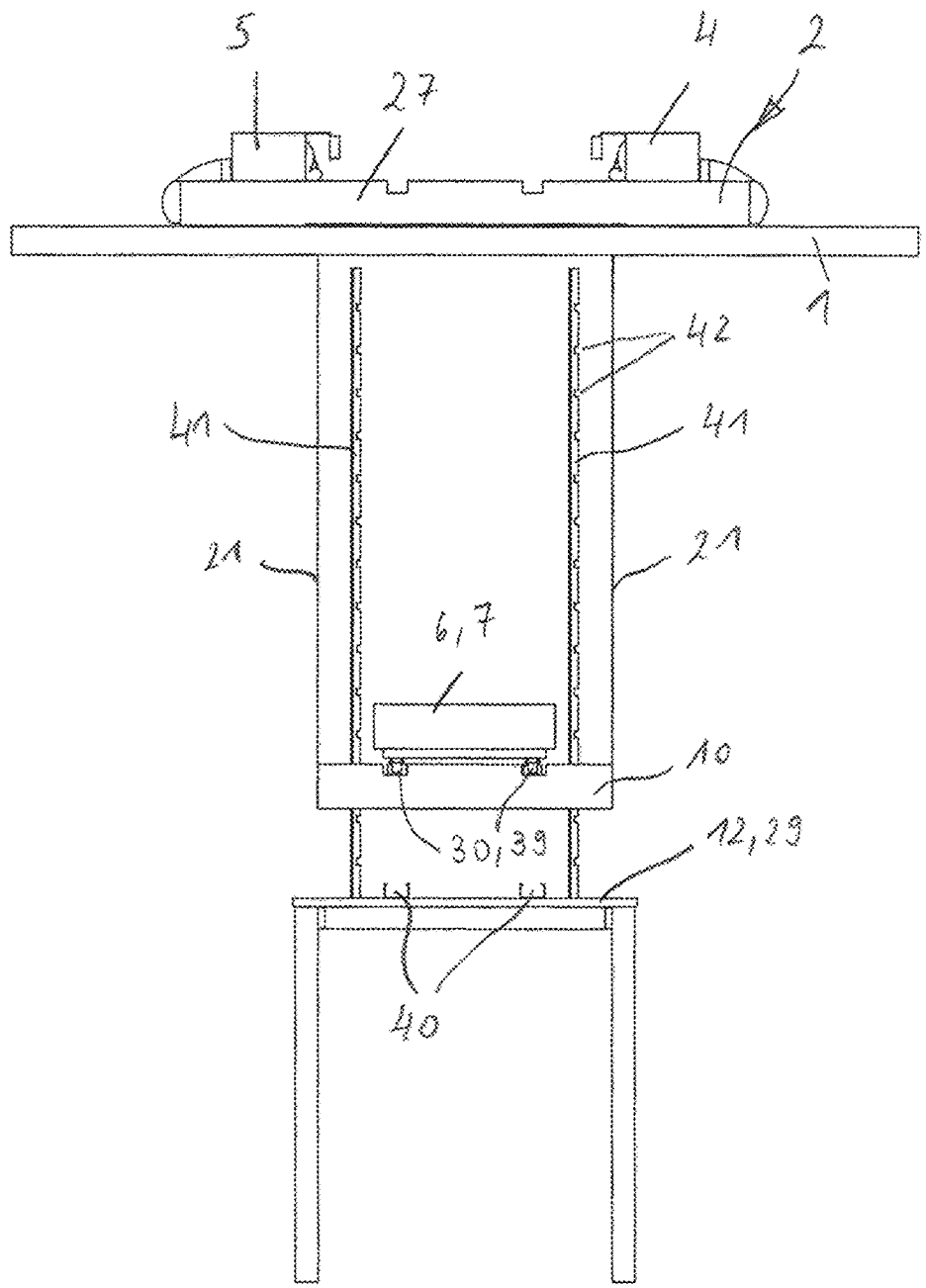

Therein:

FIG. 1: shows a perspective view of a rail mounted transport robot with a loading platform in the resting state, FIG. 2: shows a top view of the configuration, seen in the direction of arrow II, FIG. 3: shows a side view of the transport robot in the resting state, FIG. 4: shows a side view of the transport robot according to FIG. 3, with a partially lowered loading platform, FIG. 5: shows a perspective view of the transport robot with a fully lowered loading platform during the loading procedure for a crate taken from a storage space, FIG. 6: shows a side view of the configuration according to FIG. 5, FIG. 7: shows a perspective illustration of a shelved storage with a transport robot and loading platform according to the invention during a removal of individual crates, FIG. 8: shows a front view of the transport robot in a shelved storage according to FIG. 7, wherein vertical guide rails are also used in addition to the lifting belts, FIG. 9: shows a top view of the transport robot according to FIG. 8.

DETAILED DESCRIPTION OF EXEMPLARY EMBODIMENTS

Rails 1 are shown in general in FIG. 1, comprising two profile rails, which are spaced apart and run parallel to one another, on which a transport robot 2 is operated such that it can be driven along them.

The drive wheels are not illustrated. The transport robot 2 has a housing 3, which has a recess 27 in the middle, in which a loading platform 10 that can be raised and lowered is located, allowing for tolerances.

The loading platform is received separately in the recess 27 via surrounding gaps 22.

Two opposing lift drive gearboxes 4, 5 are provided, which are illustrated in greater detail in FIG. 2.

A lift motor 15, 16 is located in each lift drive gearbox 4, 5, each of which drives a drive shaft 18 via a drive belt 17, which drive shafts are connected to two opposing winding drums 19, 20 for conjoint rotation therewith.

A lift belt 21 is wound around each winding drum 19, 20.

With a synchronized operation of the lift motors 15, 16, the loading platform 10 according to FIG. 1 is lowered along a vertical lift line 11 in the direction of the arrow 14, and can be brought opposite a storage space 12 forming a horizontal (or slanted) storage plane 29.

Two parallel load panels 13 are attached to the storage plane 29, into the hollow tracks 40 of which the two conveyor belts 8, 9 of the longitudinal conveyor 30 enter. This takes place in that the longitudinal conveyor 30 has two parallel telescoping carriages 39 according to FIG. 1, which can effectively extend the conveyor belts to double or triple their original length.

A crate 7, serving as an example for a load 6 is loaded onto the loading platform 10.

The recess 27 is defined by two connecting frames 23 permanently attached to the transport robot, which run along the sides of the recess 27, and are parallel to one another.

The crate 7 is indicated by a broken line in the view according to FIG. 2 looking down onto the loading platform 10.

FIGS. 3 and 4 show two different lifting procedures, wherein the initial state is shown in FIG. 3. In the side view, only the lateral connecting framework 23, and the drive motors 24 for driving the transport robot 2, are shown.

When a lifting command is issued, the two lift motors 15, 16 are supplied with power, and drive the winding drums 19, 20, such that the loading platform 10 attached to the lifting belts 21 is lowered in the direction of the arrow 14.

FIGS. 3 and 4 also show that there is a distance measuring wheel 25 on the lateral framework of the transport robot 2, which scans the rails 1 in order to position the transport robot 2 on the rails 1.

FIG. 5 shows the lateral unloading or loading of a load 6 in the form of a crate 7. It can be seen that the loading platform 10 has now been lowered to the unloading plane 29 of the storage space 12, and the conveyor belts 8, 9, disposed on a carriage that can be displaced longitudinally, are driven into the unloading panels 13 on the storage space 12 in order to reach beneath the crate 7 placed on the unloading panels 13 from below.

When the longitudinal conveyor 30 configured as a telescoping carriage 39 is retracted into the loading platform 10, the crate 7 loaded thereon is pulled onto the loading platform 10, wherein lateral guides 28 on the loading platform 10 form the lateral delimitation of the loading plane 26 on the loading platform 10.

As a further exemplary embodiment, FIG. 7 shows the use of a transport robot with the lifting platform in a shelved storage 31 comprising storage rows 32, 33 and storage columns 34, 35.

The crates 7 disposed therein each lie on unloading panels 13 of the shelving 31, such that the crates 7 are not subject to loads from the crates above to the sides thereof.

In this manner, it is possible to reach below any of the crates 7 from the sides, through the movement of the transport robot 2 in the aisles 39, in any row or column of shelves, at any point in time, and load them onto, or remove them from, the loading platform 10.

FIG. 7 also shows that the crates do not have to be full sized. Instead, they can also be formed as crates 7, 7', 7" that have been divided along a separating line.

The transport robot can thus be driven along the entire aisle 38 in the direction of the arrow 36, and it can receive any crate in any row and any column 32-35 laterally, and load it onto the loading platform 10. The loading platform 10 is then raised until it is flush with the transport robot. The transport robot is subsequently driven out of the shelved storage 31 with the crate 7, 7', 7" loaded thereon.

A compressed and more compact structure is thus obtained, because the lifting device (loading platform 10 with the longitudinal conveyor 30 disposed thereon) disappears entirely into the interior of the transport robot 2.

With this configuration, the crates 7, 7a, 7b can also be rearranged in the shelving 31, and placed in different storage spaces 12 or on different unloading panels 13. The transport robot 2 with its loading platform 10 that can be raised and lowered, on which a longitudinal conveyor 30, formed by telescoping carriages 39, is located, can thus bring any crate 7 in the row 32 to any storage space in the opposite row 33. This takes place because the loading platform 10 of the transport robot 2 that can be raised and lowered connects the rows 32, 33 separated by the aisles 38, such that loads can be transported from one to the other.

A preferred mode of operation comprises driving the transport robot in a shelved storage 31 to a storage space 12 and initializing the loading platform 10 there, which is driven with a lowering movement to a specific storage level, and unloads the goods (crate, carton, etc.) there into the storage space 12 with the longitudinal conveyor 30. When the load has been successfully unloaded, the loading platform 10 is retracted back into its home position in the transport robot 2. This home position is queried by two micro-switches or inductive sensors or light barriers. The transport robot is first allowed to move when these allow it to do so.

If a person is located under the loading platform during the lowering procedure, this is detected by contactless safety sensors. The signal from the safety sensor is transmitted to the transport robot by wires or radio signals. The transport robot brakes, and the mechanical brakes are engaged. When the person moves out of the danger area, the transport robot automatically starts its lowering/raising movement.

FIGS. 8 and 9 show another embodiment of the invention in which it is preferred that vertical guide rails 41 are also provided, in addition to, or parallel to the lifting belts 21 described above.

It can be seen in the example of the storage space 12, which is schematically depicted as a table, but which can also be located in a shelved storage 31, that the horizontal hollow tracks 40 are located on the unloading plane 29, into which the longitudinal conveyor 30 enters with its telescoping carriage 39.

In the exemplary embodiment shown herein, the loading platform 10 extends slightly over the unloading plane 29. It is therefore not yet in its functional position.

When the loading platform 10 is lowered further, the telescoping carriages 39 of the longitudinal conveyor 30 are aligned with the hollow tracks located on the unloading plane 29.

As soon as this aligned position has been reached, the telescoping carriages 39 are placed in operation, and the crate or other type of load is slid onto the hollow track 40 of the unloading plane 29.

FIGS. 8 and 9 show that in order to prevent vibrations of the loading platform when it is lowered by the transport robot 2, additional guide rails 41 may be provided, which are connected to the storage space 12, or are located in the shelving 31 (not shown). They are preferably made of metal. The guide rails preferably have an L-shaped profile. Other profile forms can also be used, however, such as rectangular, square, or oval profiles.

The guide rails 41 reach at their upper ends to shortly below the rails 1, so that the moving transport robot will not collide with these ends. They are connected in a specific manner to either the ground or the storage space 12. They can also be laterally attached to the rows or columns in the shelving 31.

The guide rails could also reach only to directly over the storage space, such that the lifting platform makes most of its lifting movement without guidance, and is only guided shortly before reaching the working level.

They prevent vibrations that may occur in the loading platform 10 when it is lowered by the transport robot 2. This is why the loading platform is guided along the guide rails. Likewise, it is also ensured through the guide rails that the loading platform is not displaced, and the telescoping carriages 39 located on the loading platform are located in front of the stationary hollow tracks 40 on the unloading plane 29.

For this, the invention provides recesses 43 in a further development that are disposed at the edges of the loading platform 10 in accordance with FIG. 9, which basically correspond to the profile of the L-shaped guide rails 41.

The L-shaped guide rails 41 thus engage in the recesses 42 with some freedom of movement.

If the loading platform according to FIG. 8 is lowered from the recess 27 in the transport robot 2, the upper ends of the profiled guide rails 41 according to FIG. 8 engage in the L-shaped recesses 42 in the loading platform, which is thus latched to the guide rails 41.

The loading platform is then lowered—see FIG. 8—and the guide rails 41 guide the loading platform 10 in a straight line downward, without slowing it down or causing it to vibrate, and without it becoming displaced.

Notches 42 can also be formed in the region of the longitudinal extension of the guide rails 41, serving as a longitudinal measure. As a result, specific lowering heights can be activated. These are used for a precise height or angular adjustment.

A so-called gyroscope can be used to ensure that the lifting platform is precisely horizontal, which reports the slightest angular deviation to the CPU of the transport robot, which can then be readjusted for by the appropriate lift motors 15, 16.

REFERENCE SYMBOLS 1 rails
2 transport robot
3 housing
4 lift drive gearboxes
5 lift drive gearboxes
6 load, goods
7 crate (7', 7")
8 conveyor belt (8a)
9 conveyor belt (9a)
10 loading platform
11 lifting line
12 storage space
13 unloading panel
14 direction of arrow
15 lift motor
16 lift motor
17 drive belt
18 drive shaft
19 winding drum
20 winding drum
21 lifting belt
22 gap
23 connecting framework
24 drive motor (of 2)
25 distance measuring wheel
26 loading plane
27 recess (in 2)
28 lateral guide
29 unloading plane (of 12)
30 longitudinal conveyor
31 shelved storage
32 shelving row
33 shelving row
34 shelving column
35 shelving column
36 direction of arrow
37 separating line
38 aisle
39 telescoping carriages
40 hollow track
41 guide rail
42 notches
43 recesses

The invention claimed is:

1. A rail mounted transport robot, comprising: a lifting device, which is disposed in a recess of the transport robot such that the lifting device can be raised and lowered vertically and is configured for receiving a load, wherein the lifting device is a powered loading platform that can be raised and lowered, with at least one longitudinal conveyor disposed thereon, the longitudinal conveyor comprising two parallel and synchronized conveyor belts, the longitudinal conveyor telescoping in terms of an extension length of the longitudinal conveyor, the loading platform stored in the recess of the transport robot in a resting state, the recess of the transport robot extending through the transport robot, whereby the loading platform is accessible in the resting state.

2. The transport robot according to claim 1, wherein the loading platform is disposed on a hinged flap that can pivot over a horizontal axis, through which loose goods on the loading platform can be unloaded downward when the hinged flap is opened.

3. The transport robot according to claim 1, wherein the lifting device located on the transport robot comprises two separate lift drive gearboxes, each of which contains a lift motor, each of which drives a drive shaft, each drive shaft drives a pair of winding drums, each winding drum located for winding and unwinding one of a plurality of lifting belts, each of the lifting belts attached to the loading platform.

4. The transport robot according to claim 1, wherein the transport robot can be driven in an aisle in a shelved storage, in which crates or other types of unit loads are stacked on top of one another in columns or rows.

5. The transport robot according to claim 1, wherein an electrical connection is provided between the transport robot and the loading platform, which is either a wired connection or formed by a radio connection.

6. The transport robot according to claim 1, wherein vertical guide rails can be placed on or in a storage space, in which the loading platform can engage, and which guide the lifting movement of the loading platform.

7. The transport robot according to claim 1, wherein the longitudinal conveyor comprises a continuous conveyor belt.

8. The transport robot according to claim 1, wherein the conveyer belts comprise toothed belts.

9. The transport robot according to claim 1, wherein the conveyer belts comprise rope belts.

10. The transport robot according to claim 1, wherein the loading platform is disposed on a hinged flap that can pivot over a horizontal axis, through which loose goods on the loading platform can be unloaded downward when the hinged flap is opened.

11. The transport robot according to claim 1, wherein the loading platform is disposed on a hinged flap that can pivot over a horizontal axis, through which loose goods on the loading platform can be unloaded downward when the hinged flap is opened.

12. The transport robot according to claim 1, wherein the lifting device located on the transport robot comprises two separate lift drive gearboxes, each of which contains a lift motor, each of which drives a drive shaft, each drive shaft drives a pair of winding drums, each winding drum located for winding and unwinding one of a plurality of lifting belts, each of the lifting belts attached to the loading platform.

13. The transport robot according to claim 1, wherein an unloading plane for the load is formed on a storage space by two parallel unloading panels.

14. The transport robot according to claim 13, wherein the unloading panels form a hollow track, in which the conveyor belts of the longitudinal conveyor engage such that the conveyor belts can be displaced longitudinally, and retain the load from below.

15. A transport robot in a shelved storage comprising rows that are spaced apart, and a plurality of aisles therebetween, wherein numerous columns are formed in the rows, which form numerous storage spaces for unit loads, wherein the rail mounted transport robot with a lifting device that is disposed in a recess of the transport robot and can be raised and lowered vertically, connects the aisles between a plurality of rows for transport therebetween, the lifting device comprising a loading platform comprising at least one longitudinal conveyor having a telescoping design with a retracted length and an extension length of at least double the retracted length, the lifting platform disposed in the recess of the transport robot such that unloading and loading of the goods takes place laterally beneath or adjacent to the transport robot.

16. The transport robot according to claim 15, wherein the loading platform can be coupled to a plurality of vertical guide rails, which are located on the storage space and/or on a shelving.

17. A shelved storage comprising rows that are spaced apart, and a plurality of aisles located therebetween, wherein numerous storage columns are formed in the rows, and forming numerous storage spaces for a plurality of unit loads, wherein a rail mounted transport robot with a lifting device, which is disposed in a recess of the transport robot such that it the lifting device can be raised and lowered vertically and is configured for receiving a load, connects the aisles between the rows for transport therebetween, wherein the lifting device comprises a loading platform, the loading platform comprising at least on longitudinal conveyor, the longitudinal conveyor comprising two parallel and synchronized conveyor belts, and wherein an unloading plane for one of the plurality of unit loads is formed on each of the plurality of storages spaces, the unloading plane formed by two parallel unloading panels, the unloading panels forming a hollow track in which the conveyor belts of the longitudinal conveyor engage such that they can be displaced longitudinally and retain the load from below.

* * * * *